(12) United States Patent
Söhnchen et al.

(10) Patent No.: US 12,109,966 B2
(45) Date of Patent: Oct. 8, 2024

(54) AIRBAG APPARATUS FOR A VEHICLE SEAT AND VEHICLE SEAT HAVING AN AIRBAG APPARATUS

(71) Applicant: Autoliv Development AB, Vargarda (SE)

(72) Inventors: Arndt Söhnchen, Hamburg (DE); Ronald Jabusch, Elmshorn (DE); Hans-Jörg Langhoff, Bönningstedt (DE); Antto-Christian Glaesser, Hasloh (DE); Alexandru Cirstea, Elmshorn (DE); Jens Ehlers, Horst (DE)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 18/246,278

(22) PCT Filed: Sep. 8, 2021

(86) PCT No.: PCT/EP2021/074630
§ 371 (c)(1),
(2) Date: Mar. 22, 2023

(87) PCT Pub. No.: WO2022/063571
PCT Pub. Date: Mar. 31, 2022

(65) Prior Publication Data
US 2023/0356684 A1    Nov. 9, 2023

(30) Foreign Application Priority Data
Sep. 28, 2020   (DE) .................. 10 2020 125 263.3

(51) Int. Cl.
*B60R 21/207*   (2006.01)
*B60R 21/231*   (2011.01)
*B60R 21/2338*  (2011.01)

(52) U.S. Cl.
CPC .. *B60R 21/207* (2013.01); *B60R 2021/23107* (2013.01); *B60R 2021/23146* (2013.01);
(Continued)

(58) Field of Classification Search
CPC ... B60R 21/18; B60R 21/207; B60R 21/2338; B60R 2021/161; B60R 2021/23107;
(Continued)

(56) References Cited

U.S. PATENT DOCUMENTS 9,132,798 B2 * 9/2015 Yasuoka ............... B60R 21/231
10,336,283 B2 * 7/2019 Rickenbach ......... B60R 21/233
(Continued)

FOREIGN PATENT DOCUMENTS

WO      2019107073 A1    6/2019
WO   WO-2019107398 A1 *  6/2019  ............... B60N 2/42

*Primary Examiner* — Laura Freedman
(74) *Attorney, Agent, or Firm* — Foley & Lardner LLP (57) ABSTRACT

The present invention relates to an airbag apparatus for a vehicle seat, comprising
  at least one airbag module, wherein the at least one airbag module comprises at least one airbag and is designed for attachment to a backrest and/or to a seat cushion of a vehicle seat, and
  a catch strap mechanism for the airbag module, wherein the catch strap mechanism comprises at least one catch strap arrangement attached to the airbag, the catch strap mechanism being designed for attachment to the vehicle seat.

20 Claims, 5 Drawing Sheets

(52) U.S. Cl.
CPC ............... *B60R 2021/23386* (2013.01); *B60R 2021/23388* (2013.01)

(58) Field of Classification Search
CPC ........... B60R 2021/23146; B60R 2021/23386; B60R 2021/23388
See application file for complete search history.

(56) References Cited

U.S. PATENT DOCUMENTS

| | | | |
|---|---|---|---|
| 10,632,958 B2* | 4/2020 | Dry | ..................... B60R 21/2338 |
| 11,214,224 B2* | 1/2022 | Saito | ................... B60R 21/2338 |
| 11,618,404 B1* | 4/2023 | Jaradi | ............... B60R 21/23138 |
| | | | 280/730.1 |
| 11,865,996 B2* | 1/2024 | Fischer | ................. B60R 21/207 |
| 2017/0259774 A1 | 9/2017 | Matsushita | |
| 2019/0248322 A1 | 8/2019 | Herzenstiel et al. | |
| 2019/0299903 A1 | 10/2019 | Nagasawa | |
| 2020/0254953 A1 | 8/2020 | Jessup et al. | |
| 2020/0406855 A1 | 12/2020 | Dev | |
| 2022/0111818 A1* | 4/2022 | Schneider | ........... B60R 21/2334 |
| 2023/0303024 A1* | 9/2023 | Wang | ................. B60R 21/2338 |

* cited by examiner

AIRBAG APPARATUS FOR A VEHICLE SEAT AND VEHICLE SEAT HAVING AN AIRBAG APPARATUS

CROSS-REFERENCE TO RELATED APPLICATIONS

This application is a national phase application of PCT Application No. PCT/EP2021/074630, filed Sep. 8, 2021. This application also claims priority to German patent application No. 10 2020 125 263.3, filed Sep. 28, 2020.

BACKGROUND

Airbags are generally deployed to protect vehicle occupants by inflating using gas supplied by an inflator.

BRIEF DESCRIPTION OF THE DRAWINGS

The figures show schematically

DETAILED DESCRIPTION

The present invention relates to an airbag apparatus for a vehicle seat. comprising at least one airbag module, the at least one airbag module comprising at least one airbag and being designed for attachment to a backrest and/or to a seat cushion of a vehicle seat, and comprising at least one catch strap mechanism for the airbag module, the catch strap mechanism comprising at least one catch strap arrangement attached to the airbag, the catch strap mechanism being designed for attachment to the backrest and/or to the seat cushion of the vehicle seat. The present invention also relates to a vehicle seat for a motor vehicle, comprising a backrest, a seat cushion and an airbag apparatus of this kind.

Such a vehicle seat is known, for example, from US 2017/0259774 A1. in which an airbag module is provided on each of the mutually opposing sides of the backrest, the airbag of which airbag module is connected to a catch strap. The catch straps are provided to at least partially predetermine a deployment movement of the deploying airbag in the event of triggering, and to hold the airbag in a predetermined position in its deployed (inflated) state.

However, a dynamic influence on the deployment process and the arrangement of the airbag in the deployed state is not possible with the catch straps once integrated in their fixed lengths in the vehicle seat.

It is therefore an object of the present invention to eliminate the disadvantages described with reference to the prior art and to specify, in particular, an airbag apparatus and a vehicle seat comprising such an airbag apparatus, by means of which it is possible to influence the deployment process or the positioning of the airbag in the unfolded state.

The object is achieved by an airbag apparatus having the features of the independent claim. Advantageous developments of the airbag apparatus are specified in the dependent claims and in the description, it being possible for individual features of the advantageous developments to be combined with one another in a technically sensible manner.

The object is achieved in particular by an airbag apparatus having the features mentioned at the outset, the catch strap mechanism comprising a tightening device for the catch strap arrangement, the tightening device comprising a tensioning element which can be accelerated in particular pyrotechnically and which is coupled to the catch strap arrangement such that a tightening path of the airbag caused by the triggering of the tightening device corresponds to at least 1.5 times the path covered by the tightening element.

The airbag module can in particular comprise a housing, the shape of which is designed for attachment to the backrest or to the seat cushion of the vehicle seat. An inflator can also be arranged in or on the housing, which inflator is fluidically connected to the airbag such that it is deployed by the gas generated by the inflator in the event of triggering.

The catch strap arrangement of the catch strap mechanism preferably consists of exactly one textile element, such as a (catch) strap or a cable, but can also consist of a plurality of textile elements connected to one another or to the airbag. Each catch strap arrangement is connected by one end to the airbag and can be attached by the other end to the vehicle seat, in particular to the backrest or to the seat cushion, in particular immovably attached thereto.

It is now provided that at least one catch strap arrangement is coupled to a tightening device. The tightening device has at least one acceleratable tightening element, the tightening element being able to be accelerated electromechanically or pyrotechnically, for example. By actuating the electromechanical or pyrotechnical drive, a tightening process of the associated catch strap arrangement can thus be triggered. During such a tightening process, in particular the end of the catch strap arrangement connected to the airbag and moving with the airbag during the deployment of the airbag is retracted, as a result of which the deployment process or the position of the deployed airbag can be changed. Accordingly, the length of the path over which the end of the catch strap arrangement connected to the airbag (in the case of a tightened catch strap arrangement) is retracted during the tightening process (i.e. between the start and end of the tightening) is referred to as the tightening path. By contrast, the path covered by the tightening element corresponds to the length of the path which the tightening element covers during the tightening process (i.e. between the start and end of the tightening). Since the catch strap arrangement is coupled to the tightening element, the movement of the tightening element thus takes place simultaneously with the movement of the end of the catch strap arrangement coupled to the airbag.

The invention now proposes that the tightening path corresponds at least to 1.5 times, preferably at least or exactly twice, particularly preferably at least or exactly three times, or even at least four times or exactly four times, the path covered by the tightening element. Since the tightening path is thus significantly longer than the path covered by the tightening element, the tightening device can be designed to be substantially more compact, since the space for the in particular linear movement of the tightening element is smaller than the tightening path of the airbag. Alternatively, the tightening path can be increased while the length of the path covered by the tightening element remains the same.

The tightening device can in particular have a holder, by means of which the tightening device can be fastened to the backrest of the vehicle seat. the holder extending from an upper frame strut of the backrest to the rear side of the backrest, in the installed state. Not only the tightening element, comprising its in particular pyrotechnic drive, can be fastened to the holder, but also further elements of the tightening device. In particular, the holder can already comprise a fastening for the end of the catch strap arrangement, which is arranged in a stationary manner with respect to the vehicle seat in the installed state. Thus, the airbag apparatus according to the invention comprises, with the airbag module and the catch strap mechanism fastened to the holder, only two modules, which can easily be attached to a vehicle seat during assembly, the two modules being connected to one another via the catch strap arrangement.

In one embodiment, it can be provided that the end of the catch strap arrangement which can be fastened to the vehicle seat can be immovably fixed to the vehicle seat, and the tightening element can be moved relative to the catch strap arrangement during the tightening process. Thus, the entire catch strap arrangement is therefore not moved by the tightening element, but rather the catch strap arrangement tightened by the deployment process is displaced at least in portions, relative to the fixing point on the vehicle seat. Depending on the (forced) guidance of the catch strap arrangement between the tightening element and the end attached to the airbag, a larger tightening path can thus be produced than the length of the path covered by the tightening element. In this case, a pulley-like arrangement of the catch strap arrangement can be formed by the arrangement of the (forced) guide(s), such that the tightening path is longer than the path covered by the tightening element. In this case. the movement of the tightening element in particular takes place transversely to a portion of the catch strap arrangement in the initial position. In this case, the tightening element can act at the same time on one, two or more portions of the catch strap arrangement.

The tightening element is therefore the element which acts on the catch strap arrangement during the tightening movement and is driven by the drive, the tightening element being accelerated in particular transversely to the direction of extension of the catch strap arrangement by triggering the drive of the tightening device. The tightening element can comprise, for example, an eyelet through which the catch strap arrangement is guided.

The catch strap mechanism can have a first guide element for the catch strap arrangement, which is arranged in particular on the holder in such a way that the catch strap arrangement is forcibly guided between the tightening element and the airbag by means of the first guide element.

In this connection it is provided in particular that, on the one hand, the end of the catch strap arrangement can be fixed directly adjacently (i.e. in particular within less than 5 cm, or even less than 2 cm) to the tightening element which is in its initial position, on the vehicle seat (and in particular is fixed to the holder) and, on the other hand, the first guide element is likewise arranged directly adjacently (in particular within 5 cm, preferably within 2 cm) to the tightening element which is in its initial position. Thus, the stationary end of the catch strap arrangement and the first guide element are preferably at most 10 cm, particularly preferably at most 5 cm, from one another, the tightening path corresponding to almost twice the path covered by the tightening element when the tightening element is arranged between the stationary end and the first guide element.

In one embodiment, it can be provided that the tightening element of the tightening device can be accelerated linearly, the tightening device preferably being attachable or attached to the backrest of the vehicle seat, in particular via the holder, in such a way that the tightening element covers a linear path during the tightening movement, in the direction of an in particular lateral frame of the backrest. Should an unforeseen malfunction occur, and the tightening element cannot be stopped after the intended tightening movement. this would impact against the frame and thus not do any further damage.

The tightening element thus preferably executes a linear movement between its initial position and its position at the end of the tightening process.

In particular in this context, it can be provided that the tightening device can be attached to a rear side of the backrest, the catch strap mechanism comprising a second guide element for the catch strap arrangement, which can be attached to an upper side of the backrest, in particular by means of the holder, such that the catch strap arrangement is deflected, in the initial position, from the rear side of the backrest toward the airbag module arranged on one side of the backrest. In this embodiment, the catch strap arrangement thus extends in particular from its stationary end arranged on the rear side of the backrest, along the tightening element, via the first guide element, via the second guide element, and then on the upper side of the backrest, to the airbag module on the side of the backrest. The forced guidance of the catch strap arrangement is predetermined during the deployment of the airbag too, such that the orientation of the portion of the catch strap arrangement between the second guide element and the end fastened to the airbag changes during the deployment, the tensioning process reducing the length of the portion of the catch strap arrangement between the second guide element and the end fastened to the airbag.

The second guide element of the catch strap mechanism can be designed in particular by the embodiment of its surface structure coming into contact with the catch strap arrangement, in such a way that the catch strap arrangement is movable in a tightening direction by the second guide element and is inhibited or blocked in its mobility in a direction opposite the tightening direction. Thus, at the end of the tightening process, the tightening position is maintained not only by the tightening element, but also by the second guide element. In this case, the second guide element can form a type of channel for the catch strap arrangement (in particular cable), the surface structure delimiting the channel being designed such that the catch strap arrangement is movable only in one direction without a larger resistance.

In a preferred embodiment, the airbag apparatus comprises two airbag modules which can be arranged on two opposite sides of the backrest. In this case, a catch strap mechanism can be associated with each airbag module, it being possible for it to be provided that the drive, the driven tightening element and the guides of the second catch strap mechanism are also fastened to the one holder.

Figure 1:
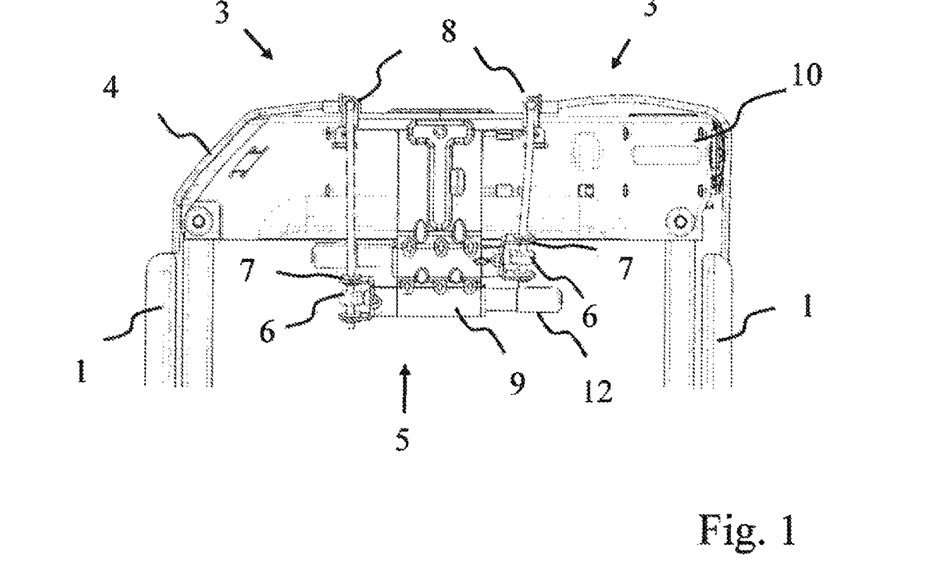
FIG. 1: a rear view of a vehicle seat.
Figure 2:
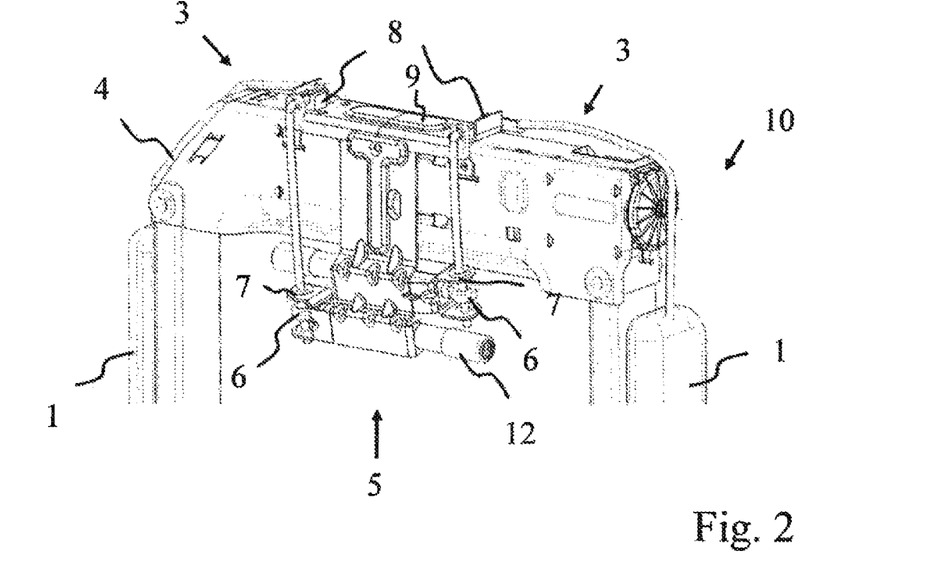
FIG. 2: a perspective view of the rear side of the vehicle seat.
Figure 4:
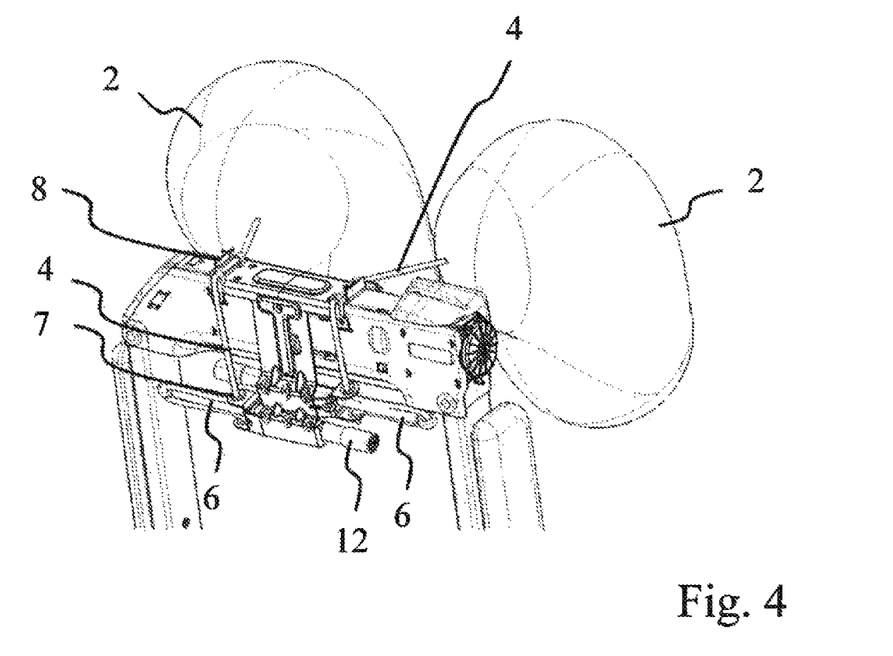
FIG. 4: the perspective view after the tightening process.
Figure 5:
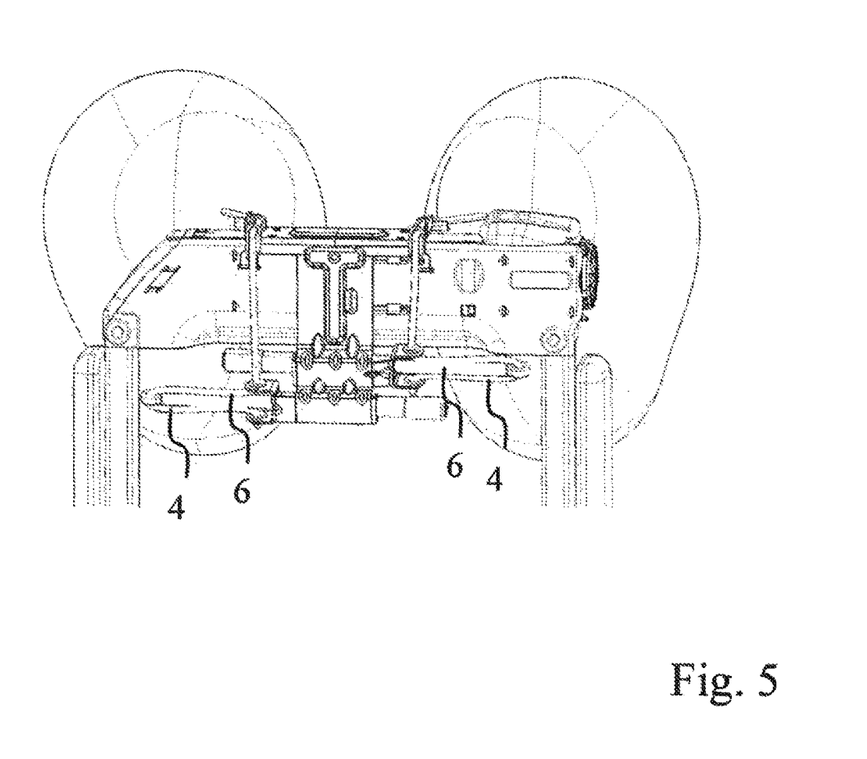
FIG. 5: a rear view after the tightening process.

The invention and the technical environment are explained below by way of example with reference to the figures. The figures show schematically FIG. 1: a rear view of a vehicle seat, FIG. 2: a perspective view of the rear side of the vehicle seat, FIG. 3: a perspective view having deployed airbags before a tightening process, FIG. 4: the perspective view after the tightening process, FIG. 5: a rear view after the tightening process, FIG. 6: a perspective view from the front with an occupant, before the tightening process, having deployed airbags, FIG. 7: the illustration according to FIG. 6 after the tightening process, FIG. 8: a detail view of a guide element, and FIG. 9: an embodiment of a vehicle seat having only one airbag module.

The airbag apparatus shown in FIGS. 1 to 8 is fastened to a backrest 10 of a vehicle seat. The airbag apparatus comprises two airbag modules 1 which are arranged on the outside on a lateral frame of the backrest 10 of the vehicle seat. An airbag 2 in a folded state is arranged in each case in a housing of the airbag module 1.

The airbag apparatus also comprises two catch strap mechanisms 3, each comprising a catch strap arrangement 4 designed as a cable. The catch strap arrangement 4 is fastened in each case by one end to an airbag 2 and by the other end to a holder 9. The catch strap arrangement is guided, from the stationary fastening on the holder 9, by a tightening element 6, by a first guide element 7 and a second guide element 8, which are all also arranged on the holder 9. The tightening element 6 is connected to a pyrotechnic drive 12. The tightening element 6 can be accelerated linearly by the pyrotechnic drive 12 in the direction of the lateral frame of the backrest 10.

Figure 3:
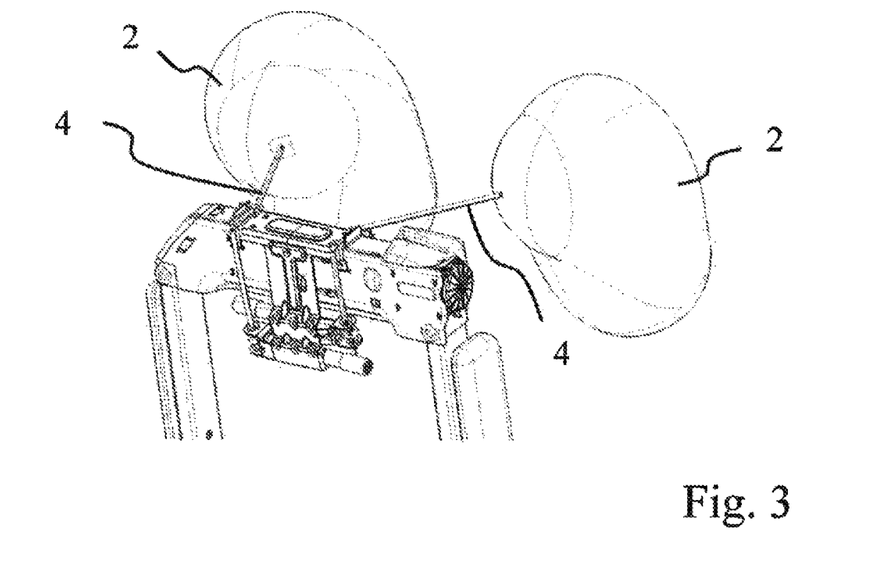
FIG. 3: a perspective view having deployed airbags before a tightening process.
Figure 6:
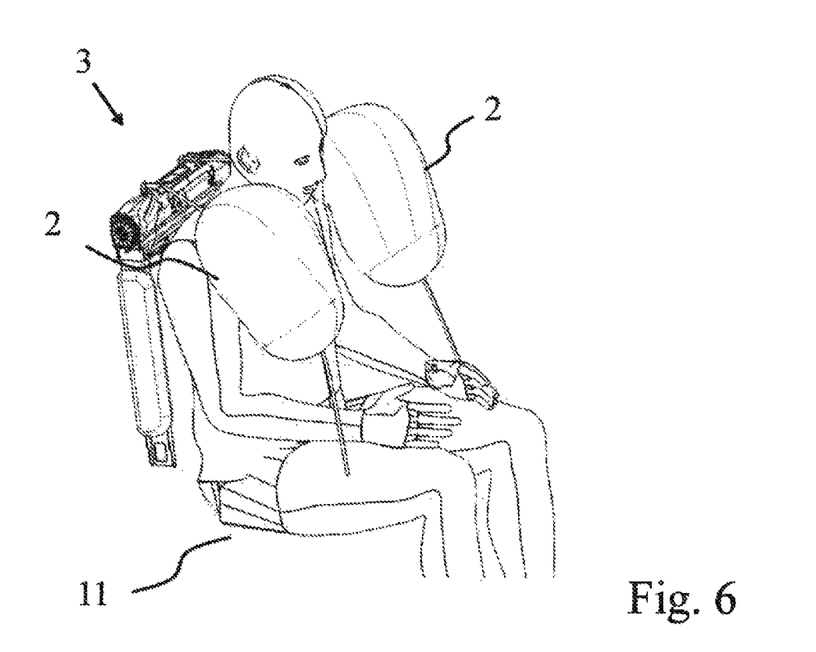
FIG. 6: a perspective view from the front with an occupant, before the tightening process, having deployed airbags.
Figure 7:
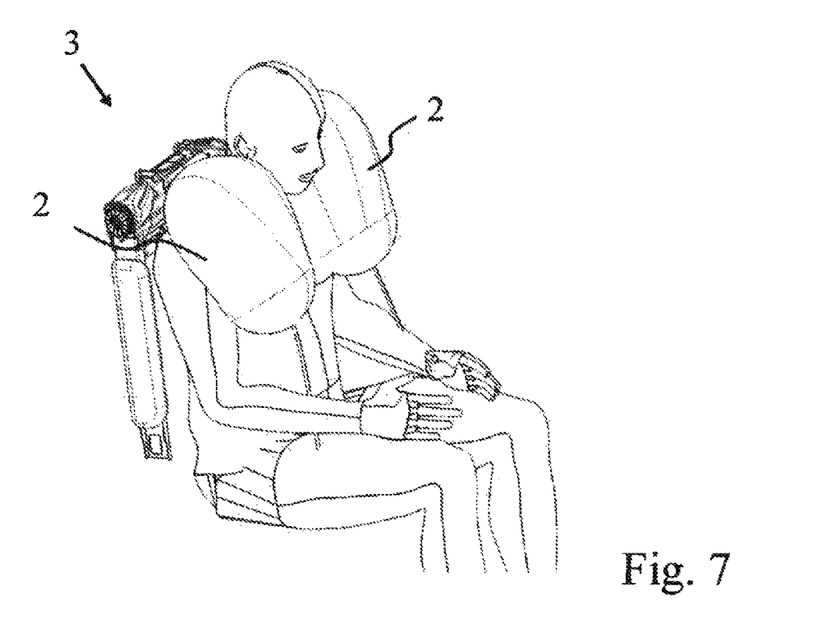
FIG. 7: the illustration according to FIG. 6 after the tightening process.

FIGS. 3 and 6 show a deployed state of the airbags 2, which these assume after an associated inflator has been ignited. In this state, the airbags 2 are arranged in front of the shoulders of the occupant. As can be seen in particular from FIGS. 4, 5 and 7, the associated tightening element 6 can be accelerated by triggering the pyrotechnic drive 12, as a result of which the end of the catch strap arrangement 4 connected to the associated airbag 2 is pulled in the direction of the backrest 10 and thus onto the shoulders of the occupant. In this case, the catch strap arrangement 4 is pulled through the first guide element 7 and the second guide element 8, while the other end of the catch strap arrangement 4 is held in a stationary manner on the holder 9. Due to this guidance of the catch strap arrangement 4, the tightening path covered by the airbags 2 is larger than the path covered by the tightening element 6.

Figure 8:
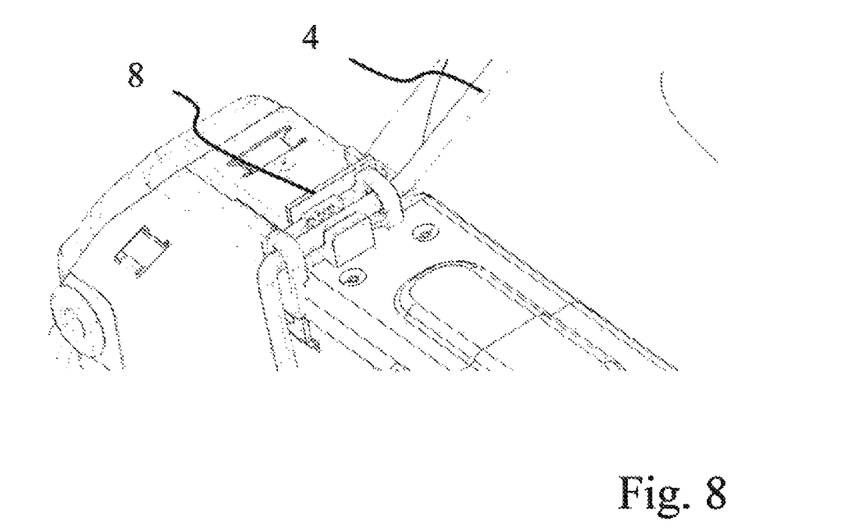
FIG. 8: a detail view of a guide element.

It can be seen from FIG. 8 that, on account of the surface structure thereof that comes into contact with the catch strap arrangement 4 (a plurality ribs arranged obliquely one behind the other), the second guide device 8 is designed such that the catch strap arrangement 4 can be moved in the tightening direction by the second guide element 8, while a movement of the catch strap arrangement 4 in the opposite direction is inhibited or blocked.

Figure 9:
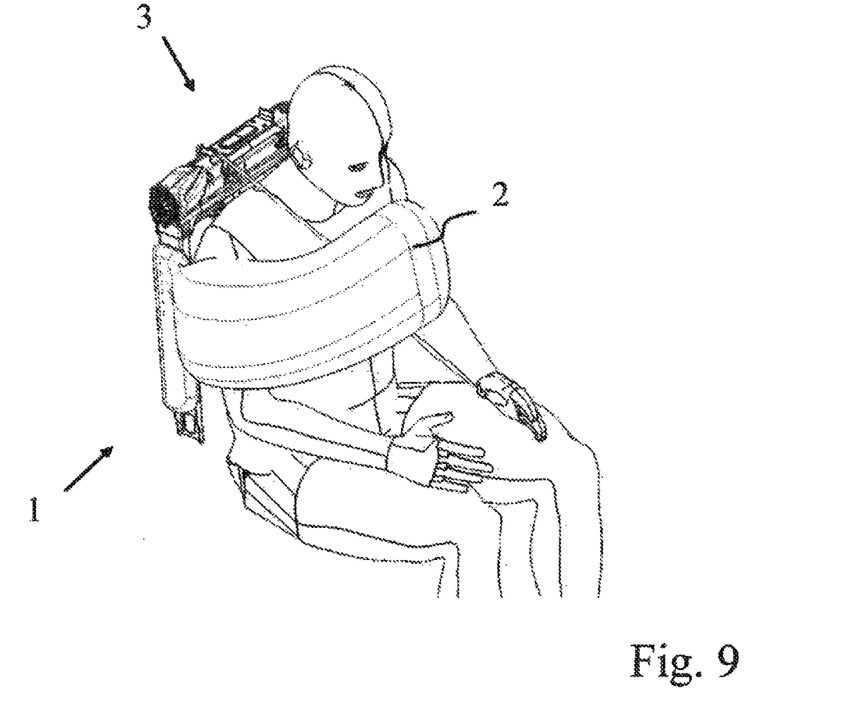
FIG. 9: an embodiment of a vehicle seat having only one airbag module.

FIG. 9 shows an embodiment of the airbag apparatus which comprises only one airbag module 1 and accordingly also only one catch strap mechanism 3. In the event of triggering, the associated airbag 2 deploys in front of the occupant's chest and can be moved towards the occupant by means of the catch strap arrangement 4.

LIST OF REFERENCE SIGNS

1 Airbag module
2 Airbag
3 Catch strap mechanism
4 Catch strap arrangement
5 Tightening device
6 Tightening element
7 First guide element
8 Second guide element
9 Holder
10 Backrest
11 Seat cushion
12 Pyrotechnic drive

The invention claimed is:

1. An airbag apparatus, comprising:
   an airbag module including an airbag, the airbag module configured to be attached to a vehicle seat;
   a catch strap module configured to be attached to the vehicle seat, the catch strap module including:
      a catch strap including a fixed end and a distal end, the distal end coupled to the airbag;
      a first guide element configured to guide the catch strap;
      a second guide element configured to guide the catch strap, wherein the first guide element is configured to guide the catch strap between the fixed end of the catch strap and the second guide element, and wherein the second guide element is configured to guide the catch strap between the first guide element and the distal end of the catch strap such that the catch strap extends in a first direction between the first guide element and the second guide element and in a second direction between the second guide element and the distal end; and
   a tightening device comprising:
      a tightening element configured to contact the catch strap between the fixed end of the catch strap and the first guide element; and
      a pyrotechnic drive configured to accelerate the tightening element to tighten the catch strap.

2. The airbag apparatus of claim 1, wherein the tightening element encloses the catch strap.

3. The airbag apparatus of claim 1, wherein the tightening element, prior to being accelerated by the pyrotechnic drive, does not contact the catch strap.

4. The airbag apparatus of claim 1, wherein a length of a tightening length of the catch strap is more than 1.5 times a length of travel of the tightening element.

5. The airbag apparatus of claim 1, wherein the second guide element is configured to allow movement of the catch strap in a tightening direction and to restrict movement of the catch strap opposite the tightening direction.

6. The airbag apparatus of claim 1, wherein the tightening device includes a holder configured to couple the tightening device to the vehicle seat, wherein the fixed end of the catch strap is attached to the holder.

7. The airbag module of claim 1, wherein the first direction is substantially perpendicular to the second direction.

8. The airbag module of claim 7, wherein the first direction is substantially parallel to a back side of a backrest of the vehicle seat, and wherein the second direction is substantially parallel to an upper side of the backrest of the vehicle seat.

9. The airbag apparatus of claim 1, wherein the airbag module includes a second airbag, and wherein the catch strap module includes a second catch strap coupled to the second airbag and a second tightening device.

10. The airbag apparatus of claim 9, wherein the tightening element and a second tightening element of the second tightening device are configured to be accelerated in opposite directions.

11. An airbag apparatus, comprising:
   an airbag module including an airbag, the airbag module configured to be attached to a vehicle seat;
   a catch strap module configured to be attached to the vehicle seat, the catch strap module including:

a catch strap coupled to the airbag;

a first guide element configured to guide the catch strap;

a second guide element configured to guide the catch strap such that the catch strap extends substantially parallel to a back portion of a backrest of the vehicle seat between the first guide element and the second guide element and substantially parallel to an upper portion of the backrest of the vehicle seat between the second guide element and the airbag; and a tightening device comprising:

a tightening element configured to enclose the catch strap between the fixed end of the catch strap and the first guide element; and a pyrotechnic drive configured to accelerate the tightening element to tighten the catch strap.

12. The airbag apparatus of claim 11, wherein the tightening element, prior to being accelerated by the pyrotechnic drive, does not contact the catch strap.

13. The airbag apparatus of claim 11, wherein the tightening element is coupled to the catch strap.

14. The airbag apparatus of claim 11, wherein a length of a tightening length of the catch strap is more than 1.5 times a length of travel of the tightening element.

15. The airbag apparatus of claim 11, wherein the second guide element is configured to allow movement of the catch strap in a tightening direction and to restrict movement of the catch strap opposite the tightening direction.

16. The airbag apparatus of claim 11, wherein the tightening device includes a holder configured to couple the tightening device to the vehicle seat.

17. The airbag apparatus of claim 11, wherein the pyrotechnic drive is configured to linearly accelerate the tightening element.

18. The airbag apparatus of claim 11, wherein the pyrotechnic drive is configured to accelerate the tightening element towards a lateral frame of the vehicle seat.

19. The airbag apparatus of claim 11, wherein the airbag module includes a second airbag, and wherein the catch strap module includes a second catch strap coupled to the second airbag and a second tightening device.

20. The airbag apparatus of claim 19, wherein the tightening element and a second tightening element of the second tightening device are configured to be accelerated in opposite directions.

* * * * *